United States Patent [19]
Callahan et al.

[11] Patent Number: 6,123,495
[45] Date of Patent: *Sep. 26, 2000

[54] TRANSPORT FOR MOVING AND LOADING AN AUXILIARY FUEL TANK

[75] Inventors: Robert Dean Callahan, Mesa; Gary Bruce Robertson, Phoenix, both of Ariz.

[73] Assignee: Robertson Aviation L.L.C, Tempe, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 09/097,948

[22] Filed: Jun. 16, 1998

[51] Int. Cl.$^7$ .................................. B60P 1/02; B60P 1/64
[52] U.S. Cl. ...................... 414/340; 254/323; 414/495; 414/498; 414/540
[58] Field of Search ...................................... 414/340, 343, 414/345, 347, 348, 399, 458, 495, 498, 540, 589; 254/4 R, 4 C, 48, 323, 329; 244/137.1; 294/67.4

[56] References Cited

U.S. PATENT DOCUMENTS

| | | | |
|---|---|---|---|
| 2,387,527 | 10/1945 | Nagamatsu | 414/399 X |
| 2,702,678 | 2/1955 | Flock, Jr. | 414/540 X |
| 2,950,073 | 8/1960 | McLain et al. | 414/540 X |
| 3,028,130 | 4/1962 | Burton | 414/347 X |
| 3,552,587 | 1/1971 | Warren | 244/137.1 |
| 4,461,455 | 7/1984 | Mills et al. | 414/589 X |
| 4,787,788 | 11/1988 | Versteeg | 414/343 X |
| 5,305,513 | 4/1994 | Lucid et al. | 414/458 X |
| 5,536,131 | 7/1996 | Behr | 414/495 |
| 5,630,693 | 5/1997 | Sobina | 414/495 |
| 5,681,139 | 10/1997 | Szanto | 414/495 |

FOREIGN PATENT DOCUMENTS 2190349  11/1987  United Kingdom ................... 414/495

*Primary Examiner*—James W. Keenan
*Attorney, Agent, or Firm*—Parsons & Goltry; Robert A. Parsons; Michael W. Goltry

[57] ABSTRACT

The transport includes a U-shaped chassis frame supported on wheels and a lift frame vertically movable within the chassis such that the lift frame can rest on the ground and move above the chassis frame. A plurality of winches are located on the lift frame and are driven in common through a step-down gear mechanism powered by a hand crank. Each winch includes a strap having a free end and a fixed end attached to the winch. The free end includes a fastener for temporarily attaching the strap to the chassis frame. Near each winch is a riser attached to the chassis frame and the strap from the winch passes over the riser to enable the lift frame to be raised slightly higher than the chassis frame.

10 Claims, 4 Drawing Sheets

TRANSPORT FOR MOVING AND LOADING AN AUXILIARY FUEL TANK

BACKGROUND OF THE INVENTION

This invention relates to cargo and material handlers and, in particular, to a transport for moving and loading an auxiliary fuel tank into an aircraft, e.g. a helicopter.

Auxiliary fuel tanks have long been used to extend the range of a helicopter and other aircraft or to provide refueling capability at a remote location. Depending upon the size and type of helicopter, auxiliary fuel tanks have been located in pods outside the helicopter, under seats, in cargo bays, and elsewhere. For some applications, such as surveillance or patrol, an added fuel tank may be an essentially permanent installation. For rescue, or other operations, it is desirable that an auxiliary fuel tank be easily installed or removed in order to re-configure a helicopter as quickly as possible; e.g. in ten minutes or less.

A problem with many of these installations is simply handling an empty auxiliary fuel tank, which can weigh two hundred twenty-five pounds or more and is physically large and hard to grasp. After initial use, an auxiliary fuel tank will weigh even more because the fuel cannot be removed completely from the tank using the internal pump. Lifting an auxiliary fuel tank into the magazine bay of a helicopter, or removing the tank from the bay, has typically been done by hand. A suitable lifting mechanism has not been found having sufficient lift range and sufficient dexterity to locate the tank properly in the bay. By dexterity is meant the ability to tilt the tank to match the tilt of the airframe relative to the ground, which is necessary to properly locate the tank in the aircraft.

Transporting an auxiliary fuel tank or an ammunition magazine to or from an aircraft is not particularly difficult. The difficulty comes when the tank or magazine must be loaded through the belly of the aircraft. The clearance between the fuselage and ground is often less than the height of the tank on a carrier. Typically, the tank is removed from the carrier, positioned under the aircraft by hand, and then raised into position by hand. The entire operation is not as safe as it could be for the personnel handling the tank and may cause damage to the tank itself.

In view of the foregoing, it is therefore an object of the invention to provide a transport that can lift an auxiliary fuel tank completely into the belly of an aircraft.

Another object of the invention is to provide a transport that can position an auxiliary fuel tank directly underneath an awaiting aircraft.

A further object of the invention is to provide a transport that can tilt an auxiliary fuel tank a magazine while lifting the tank into an aircraft.

SUMMARY OF THE INVENTION

The foregoing objects are achieved in this invention in which the transport includes a chassis frame supported on wheels and a lift frame vertically movable within the chassis such that the lift frame can rest on the ground and move above the chassis frame. A plurality of winches are located on the lift frame and are driven in common through a step-down gear mechanism powered by a hand crank. Each winch includes a strap having a free end and a fixed end attached to the winch. The free end includes a fastener for temporarily attaching the strap to the chassis frame. Near each winch is a riser attached to the chassis frame and the strap from the winch passes over the riser to enable the lift frame to be raised slightly higher than the chassis frame. An auxiliary fuel tank or an ammunition magazine is loaded into an aircraft by positioning the transport under the aircraft, attaching the free ends of the straps to the aircraft, and then operating the winches.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
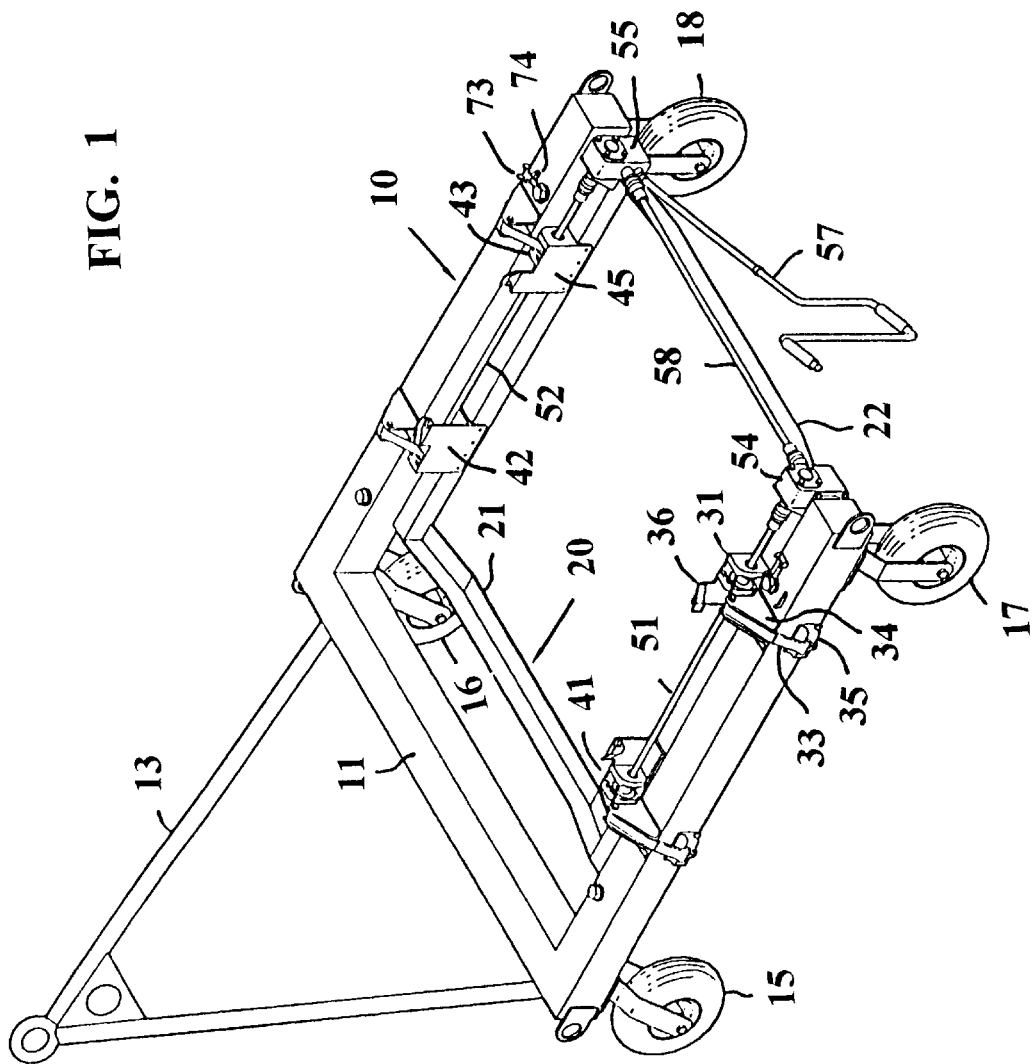
FIG. 1 is a perspective view of a transport constructed in accordance with a preferred embodiment of the invention.

In FIG. 1, a transport constructed in accordance with the invention includes two major components, chassis 10 and lift frame 20 for supporting an auxiliary fuel tank (not shown). Lift frame 20 is vertically movable within chassis 10 and can be lowered to just above ground level for moving the auxiliary fuel tank under an aircraft or raised and supported on chassis 10 for transporting the tank with a substantial ground clearance.

Chassis 10 includes U-shaped frame 11 having tow bar 13 attached at the bottom of the U. Tow bar 13 is hinged at frame 11 to swing vertically. Wheels 15, 16, 17, and 18 are attached near the corners of frame 11 and wheels 15 and 16 are preferably mounted on casters to provide turning capability for the chassis. Frame 11 is preferably made from rectangular aluminum tubing.

Lift frame 20 is made from smaller square aluminum tubing and the frame is rectangular in plan view but is not necessarily planar. As illustrated in FIG. 1, frame 20 is dished for clearing an auxiliary fuel tank or magazine; i.e. sides 21 and 22 of the frame bow downward slightly. The mechanism for raising and lowering frame 20 includes four small winches driven through reduction gearing by a hand crank. It is important to note that the mechanism is attached to lift frame 20, not to chassis 10.

Winch 31 includes a plurality of turns of strap 33, which extends from the winch over riser 34 to catch 35. Riser 34 provides an elevated reference point that enables lift frame 20 to be raised slightly above chassis frame 11. The risers also reduce tension in the straps when the straps are attached to chassis frame 10 by decreasing the horizontal component of the tension, particularly when lift frame 20 is at approximately the same height as the chassis frame. Strap 33 terminates in a suitable hook or other fastener for holding securely to catch 35, which is shaped to receive the hook.

There are four winches located near the corners of lift frame 20, winches 31, 41, 42 and 43. Each winch is attached to a baseplate, such as baseplate 45, which is attached to lift frame 20. Each baseplate also includes a receiver, such as receiver 36, for connection to an auxiliary fuel tank or magazine. The shape and location of the receivers depend upon the particular auxiliary fuel tank being transported. In a preferred embodiment of the invention, the frame for the winch, the base plate, and the receiver were milled from a single block of aluminum as a winch assembly rather than made as separate pieces. As such, directly opposing winch assemblies are mirror images and diagonally opposite winch assemblies are the same; i.e. there is a handedness to the winch assemblies.

The winches are rotated together from a hand driven crank. In particular, winches 31 and 41 are on common shaft 51 and winches 42 and 43 are on common shaft 52. Shafts 51 and 52 rotate in opposite directions and are driven through gear reduction boxes 54 and 55 by hand crank 57 and shaft 58, thereby operating the winches simultaneously. The gear ratio of gear reduction boxes 54 and 55 depends upon the weight of the cargo being lifted. For full auxiliary fuel tanks or full ammunition magazines, a ratio of 20:1 or more may be required. Crank 57 is coupled to gear box 55 by a universal joint, enabling the crank to be moved from a storage position adjacent shaft 58 to a comfortable operating position.

Figure 2:
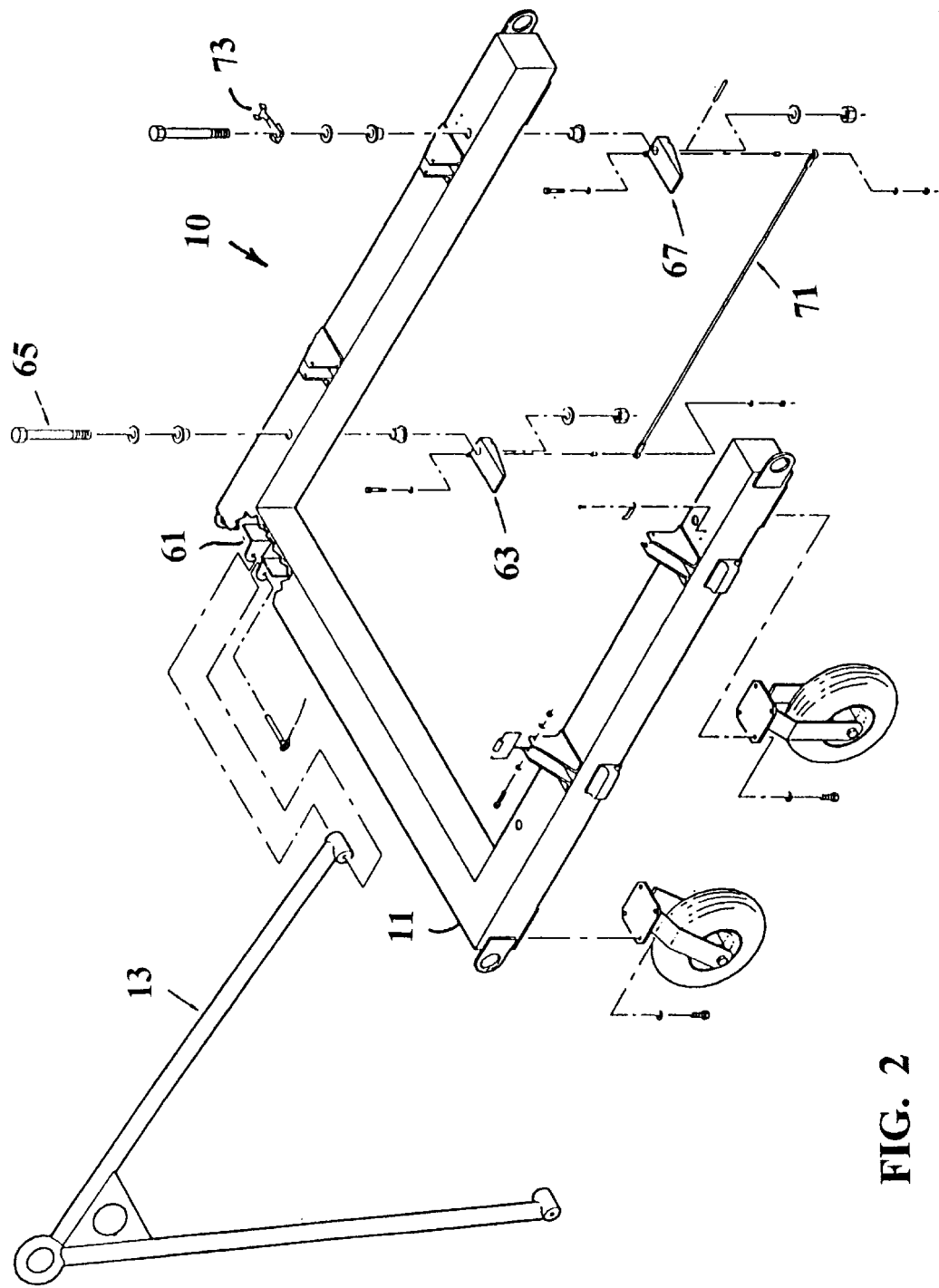
FIG. 2 is an exploded view of the chassis of the transport.

FIG. 2 is an exploded view of chassis 10, showing hinge 61 for attaching tow bar 13 and bracket 63 for supporting the lifting frame. Bracket 63 is attached to chassis frame 11 by bolt 65, about which the bracket can rotate. There are four such brackets, located in pairs on opposite sides of the chassis. Two of the brackets are obscured by frame 11 in the view shown in FIG. 2. Brackets 63 and 67 are interconnected by bar 71 and are operated together by handle 73. The other two brackets are also operated together. Detent 74 secures the brackets in the support position.

When an auxiliary fuel tank is being transported, the brackets point inwardly and the lifting frame rests on the brackets. This provides a high ground clearance, determined largely by the diameter of the tires, and the tank can be pushed or towed rapidly. Using the brackets for transport also reduces stress on the straps, which are not supporting the load during transport.

At an aircraft, the tank is raised, the brackets are rotated out of the way, e.g. rotated 90°, and the lifting frame is lowered to just above the ground. In this configuration, the auxiliary fuel tank is virtually on the ground and can easily be rolled under the aircraft. Once positioned under the aircraft, the lifting frame is lowered onto the ground and the straps are removed from the chassis.

There are attachment points designed for bearing a load at various locations within the aircraft. The straps are unwound from the winches and hooked onto the attachment points within the aircraft located above each winch. The tank can now be lifted into the aircraft by turning the hand crank. This arrangement has at least two advantages. A first advantage is that the aircraft now becomes the frame of reference for the lift frame. If the fuselage of the aircraft is tilted in any direction, then the tank will be tilted the exact same way when raised. A second advantage is that the tank is not being lifted from below but is being lifted from above, a much more stable configuration (the points of support are above the tank's center of gravity for most of the lift).

Figure 3:
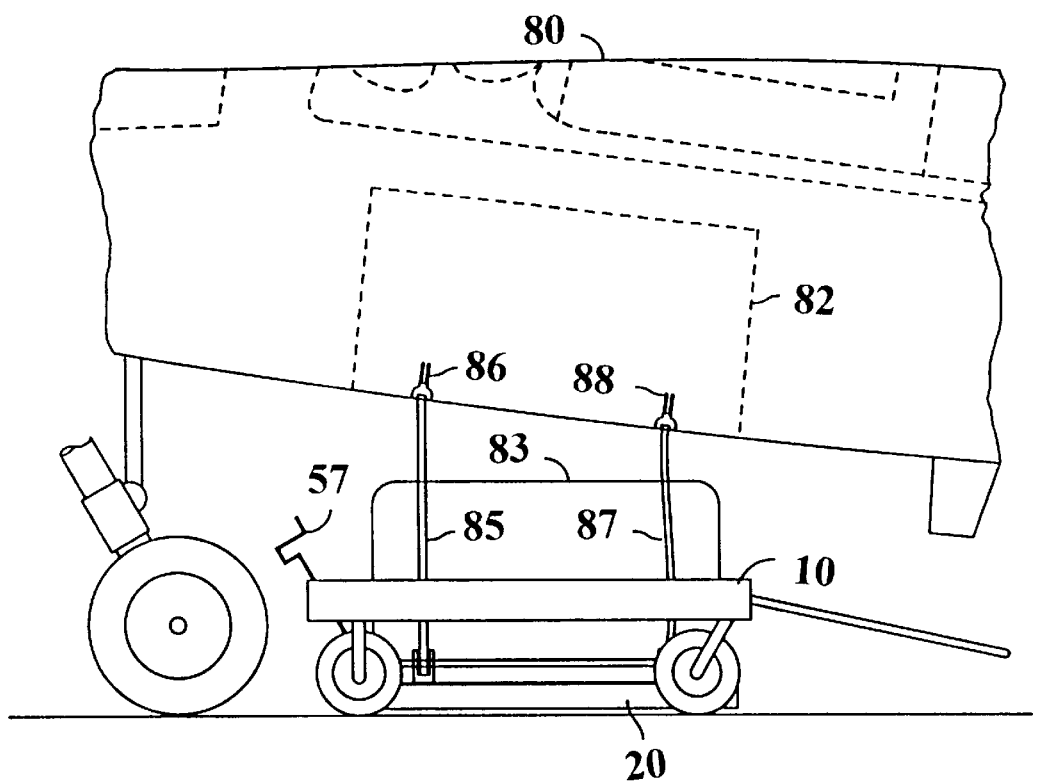
FIG. 3 illustrates positioning an auxiliary fuel tank underneath a helicopter for loading.
Figure 4:
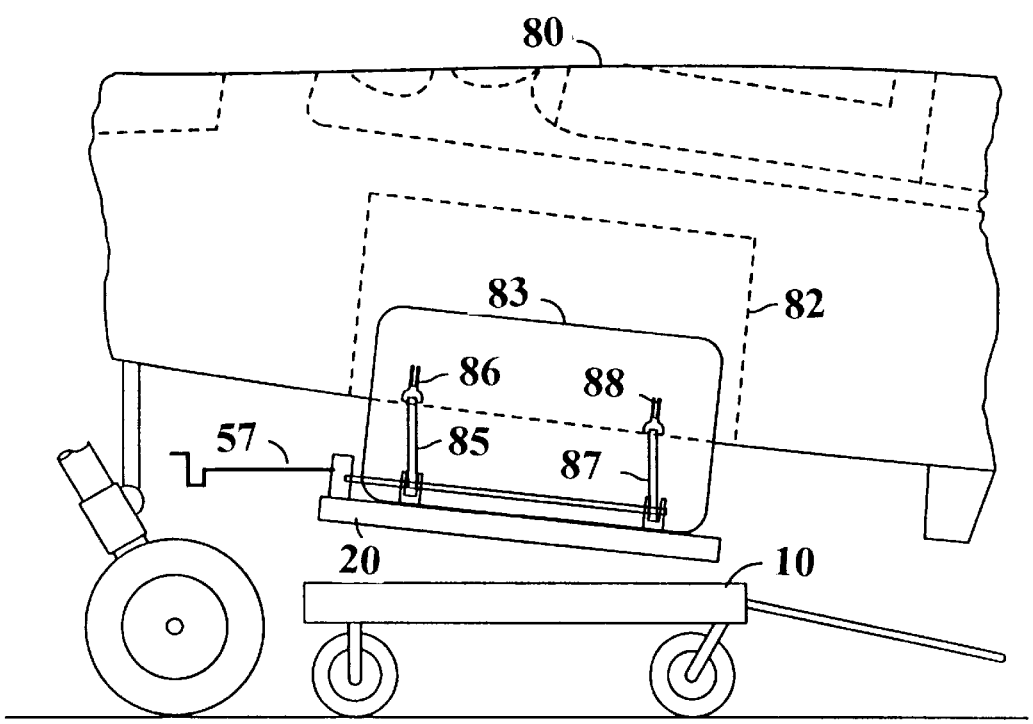
FIG. 4 illustrates loading an auxiliary fuel tank into the magazine bay of a helicopter.

FIGS. 3 and 4 illustrate loading an auxiliary fuel tank into a helicopter. In these figures the tilt of the helicopter is exaggerated for illustration. Helicopter 80 includes magazine bay 82 receiving auxiliary fuel tank 83. As originally designed, bay 82 held ammunition magazine. If a previous mission required that ammunition be on board, then the transport of the invention is first used to unload the ammunition, which is in a container having the same attachment points as the auxiliary fuel tank.

When tank 83 is located under bay 82, the lift frame is lowered to the ground and straps 85 and 87 are removed from chassis 10 and connected to fittings within helicopter 80. Because of the tilt of the helicopter, strap 85 is relatively taut and strap 87 is slack. The straps (not shown) on the other side of tank 83 are also connected to helicopter 80. Crank 57 is then rotated to raise tank 83 into the magazine bay.

As illustrated in FIG. 4, helicopter 80 is now the frame of reference for the lift mechanism and tank 83 and lift frame 20 are tilted the same amount as the helicopter. The operator continues to turn crank 57 to raise tank 83 into position. When in position, suitable pins are inserted to attach tank 83 to the helicopter. Because of the tilt, positioning tank 83 is greatly facilitated. After the tank is fastened in place, the straps are unhooked from the helicopter and lift frame 20 is placed in chassis 10, resting on the brackets described in reference to FIG. 2.

The invention thus provides a transport that can position an auxiliary fuel tank or magazine directly underneath an awaiting aircraft and lift the tank or magazine completely into the aircraft. Positioning the tank or magazine is facilitated by tilting the tank or magazine while lifting it into the aircraft. Instead of being a four man operation, loading an auxiliary fuel tank or magazine can now be done by two persons.

Having thus described the invention, it will be apparent to those of skill in the art that various modifications can be made within the scope of the invention. For example, while described in the specific context of a transport for an auxiliary fuel tank or an ammunition magazine, the transport can be adapted to load any other article or container into an aircraft or vehicle. The winches can be motor driven if the weight of the transported article justifies the expense. The number of winches or support brackets depends upon the load to be supported and lifted. "Ground" refers to any support surface on which the transport or the helicopter is resting, whether that surface be earth, tarmac, concrete, wood, steel, or other material. The straps can be any material suitable for the load. Woven straps of polyester or nylon are preferred because they are strong, quiet, and do not deteriorate easily in the presence of kerosene or other fuels or solvents. A closed (rectangular) or other shaped chassis frame could be used instead of a U-shaped frame as long as the lift frame can be lowered sufficiently for the transport to roll under an aircraft while carrying an auxiliary fuel tank or other container to be loaded into the aircraft.

What is claimed as the invention is:

1. A transport for moving and loading cargo on an aircraft, said transport comprising:
    a chassis including a chassis frame supported on wheels;
    a lift frame vertically movable within said chassis such that the lift frame can rest on the ground below the chassis frame and move above said chassis frame;
    a lift mechanism on said lift frame for raising and lowering said lift frame relative to said chassis, said lift mechanism includes a plurality of winches carried by the lift frame and driven in common,
wherein each winch includes a strap having a free end with a fastener releasably attached to the chassis frame and attachable to the aircraft for lifting the cargo carried by the lift frame into a cargo space thereof and a fixed end attached to the winch.

2. The transport as set forth in claim 1 wherein said chassis frame include brackets for supporting said cargo during transport.

3. The transport as set forth in claim 2 wherein said brackets are movable between a first position for supporting said cargo and a second position for permitting the cargo to be lowered through said chassis frame.

4. The transport as set forth in claim 1 wherein said lift mechanism includes a step-down gear mechanism for driving said winches in common.

5. The transport as set forth in claim 4 and further including a hand crank coupled to said step-down gear mechanism.

6. The transport as set forth in claim 5 and further including a universal joint for coupling said hand crank to said step-down gear mechanism.

7. The transport as set forth in claim 1 and further including a plurality of risers attached to said chassis frame, wherein the free end of each strap passes over a riser to enable the lift frame to be raised slightly higher than said chassis frame when the free ends of said straps are attached to said chassis frame.

8. The transport as set forth in claim 1 wherein said cargo is an ammunition magazine.

9. The transport as set forth in claim 1 wherein said cargo is an auxiliary fuel tank having attachment points substantially identical to an ammunition magazine.

10. The transport as set forth in claim 1 wherein said cargo is an auxiliary fuel tank.

\* \* \* \* \*